W. R. GREEN.
TIRE CARRIER.
APPLICATION FILED JULY 8, 1915.

1,250,161.

Patented Dec. 18, 1917.
2 SHEETS—SHEET 1.

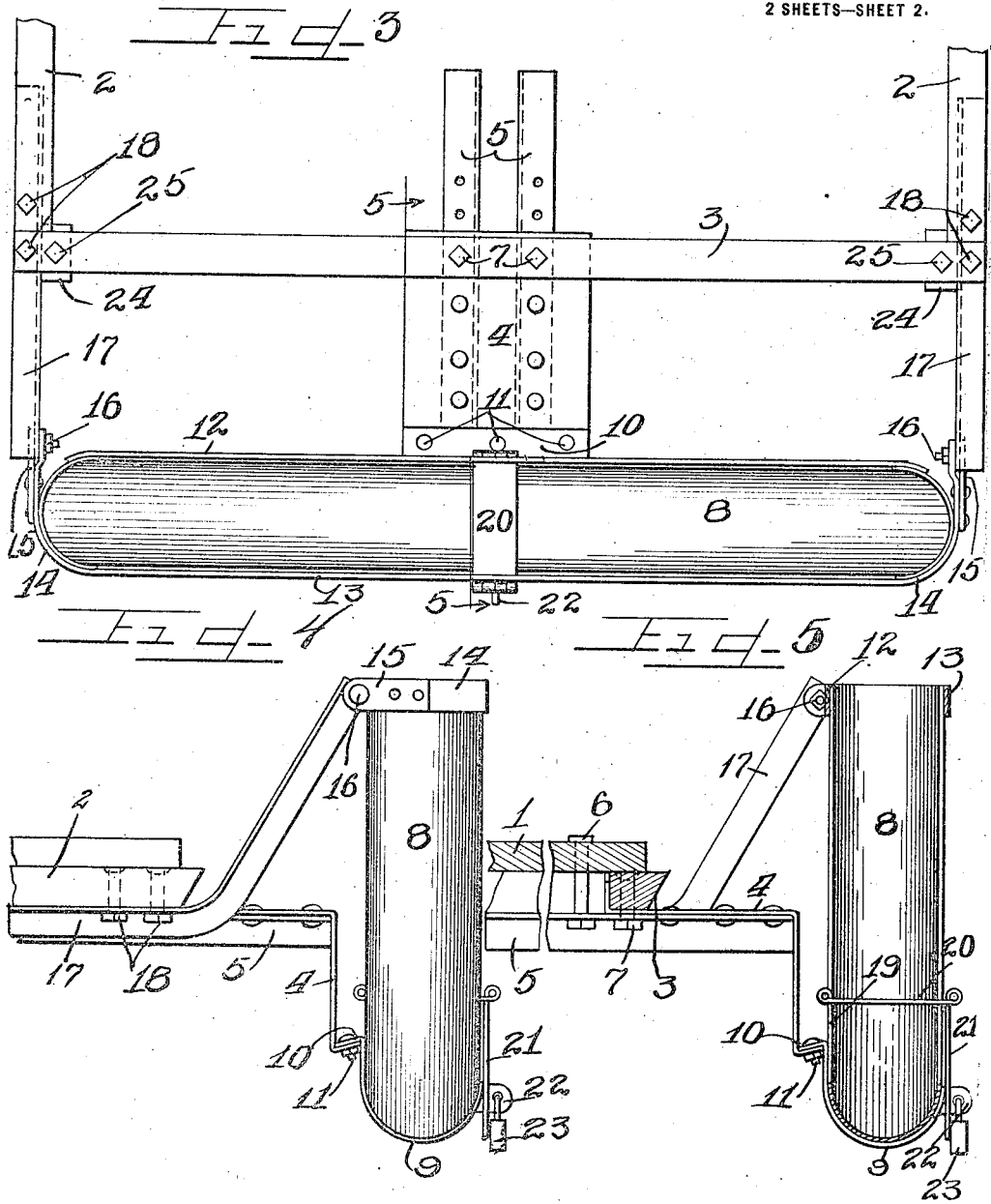

UNITED STATES PATENT OFFICE.

WALTER R. GREEN, OF CHICAGO, ILLINOIS.

TIRE-CARRIER.

REISSUED

1,250,161.   Specification of Letters Patent.   Patented Dec. 18, 1917.

Application filed July 8, 1915.  Serial No. 38,657.

*To all whom it may concern:*

Be it known that I, WALTER R. GREEN, a citizen of the United States, and a resident of the city of Chicago, in the county of Cook and State of Illinois, have invented certain new and useful Improvements in Tire-Carriers; and I do hereby declare that the following is a full, clear, and exact description of the same, reference being had to the accompanying drawings, and to the numerals of reference marked thereon, which form a part of this specification.

Most tire carriers with which motor cars are equipped do not hold the tire rigidly in position, thus permitting the same to vibrate with a consequent objectionable rattle, and also in many instances chafing the tire itself. Other types of carriers, particularly those constructed for attachment to the rear end of a car, so as to be incapable of vibration, are cumbersome, unsightly, and difficult to attach.

This invention relates to an improved type of carrier which contacts the tire around a considerable portion of its periphery, and which is constructed for rigid attachment to a car body to rigidly and securely support a tire in position.

It is an object therefore of this invention to construct a tire carrier comprising a semicircular element suitably attached by brackets to the body of a motor car, and provided with a lock to prevent unauthorized removal of a tire therefrom.

It is also an object of this invention to construct a tire carrier provided with attaching brackets whereby said carrier is connected to the body of the car at three points to insure positive rigid association thereof with the car body, and having a semi-circular concave channel element in which the tire is placed fitting closely thereto to prevent shifting of the tire in the carrier.

It is furthermore an important object of this invention to construct a tire carrier for attachment upon the rear end of a motor car by brackets connected to the side and end sills thereof, acting to support a tire in upright position spaced from the body of the car and prevented from rattling or vibrating thereon.

It is finally an object of this invention to construct a tire carrier simple in construction and easy to attach in place.

The invention (in a preferred form) is illustrated in the drawings and hereinafter more fully described.

In the drawings:

Fig. 3 is a top plan view of the assembled tire carrier shown associated with a part of the frame of the motor car body.

Fig. 4 is a side elevation of the device.

Fig. 5 is a section taken on line 5—5 of Fig. 3.

As shown in the drawings:

Figure 1:
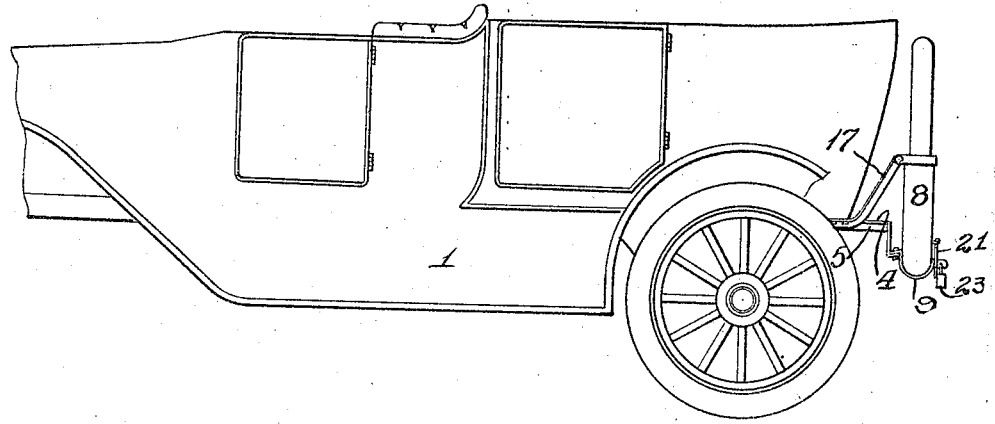
Figure 1 is a fragmentary side elevation of a motor car equipped with a tire carrier embodying the principles of my invention.
Figure 2:
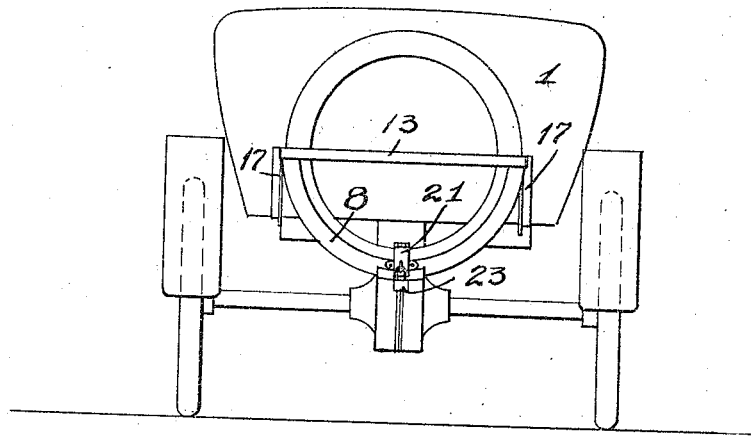
Fig. 2 is a fragmentary rear elevation of a motor car, showing the tire carrier thereon.

The reference numeral 1, indicates as a whole the body of a car, which is mounted upon a chassis comprising side sills 2, which are connected at their ends at the rear of the car by an end sill 3. As clearly shown in Fig. 5, the floor of the body 1, of the car rests upon said end sill 3, and a centrally disposed bracket for the tire carrier is mounted on the car at this point. For this purpose a heavy sheet metal plate 4, is bent into a Z-shape and has secured by rivets or otherwise on its under surface a pair of angle irons 5, which, as shown in Fig. 3, project beyond the end of the plate 4, and are apertured to receive attaching bolts 6, therethrough, extending through the floor of the car body 1, as shown in Fig. 5. Registering apertures are also provided through said angle irons 5, and plate 4, to receive therethrough lag screws 7, which are threaded into the wooden end sill member 3, of the car body. Of course any number of attaching bolts 6, may be used to attach the angle irons 5, to the body of the car to give the desired rigidity, and the up-turned end of the Z-shaped plate 4, as clearly shown in Fig. 5, engages behind the end sill member 3.

The tire carrier into which the tire casing is placed consists of a semi-circular concave channel 8, and spot welded to the central lower portion thereof is a correspondingly curved plate 9, which on the inner side of said channel member extends upwardly and is flanged over, as denoted by the reference numeral 10, for engagement to the outwardly bent end of the plate 4, by means of bolts 11, or rivets if desired. A flat bar 12, is spot welded to the upper extremities of the channel member 8, extending horizontally thereacross to reinforce and brace the same, and another bar 13, is similarly attached thereto, but with its ends or extremities curved inwardly around the channel member 8, and projecting rearwardly therefrom. Brazed or spot welded to the extremities 14, of said bar 13, are plates 15, each of which at its end is spaced from the end of the member 14, due to the fact that the ends of the latter are slightly offset, thus affording a recess between each of said members 14 and 15.

Engaged through registering apertures in the ends of said members 14 and 15, are bolts 16, by which said members may be attached to suitable brackets secured upon the side sills of the car. For this purpose relatively heavy angle irons 17, are attached by means of bolts 18, to the underside of the side sills 2, as clearly shown in Figs. 3 and 4, and are each bent upwardly and provided with an aperture through one flange thereof to receive said bolts 16 therethrough, when the flange is engaged between the members 14 and 15. Inasmuch as there is one of said brackets on each side of the carrier acting together with the central bracket plate 4, the carrier is rigidly supported in position.

In order to lock the tire in the carrier a small upright plate 19, is secured upon the inner surface of the upper end of the curved plate 9, and has hinged thereto a strap 20, which in turn has hinged thereto a hasp 21, adapted to engage over an apertured bracket piece 22, through which a padlock 23, is locked.

The operation is thought to be obvious from the description. The attachment of the carrier to the motor car is an extremely simple operation, requiring only that holes be drilled through the respective side and end sills and floor of the car body for the attaching bolts and lag screws used in mounting the carrier. The device is made entirely of metal, and most of the parts are of standard stock, thus making manufacture thereof a simple and inexpensive matter. Of course, if circumstances require the parts may be so deformed as to tilt the carrier toward or away from the car, but I have shown the same as mounted in upright position, as ordinarily this is the preferred manner of carrying the tires. A small lateral wing plate 24, is shown spot welded to the flange of the side bracket member 17, and apertured to receive an attaching bolt or lag screw 25, therethrough for attachment to the end sill of the car body, but the use of this on the device is optional and its length may be changed to accommodate more attaching bolts if so desired.

I am aware that various details of construction may be varied through a wide range without departing from the principles of this invention, and I therefore do not purpose limiting the patent granted otherwise than necessitated by the prior art.

I claim as my invention:

1. In a device of the class described a semi-circular channel member, a plate secured centrally thereteneath, a Z-shaped plate attached to said first mentioned plate, angle irons riveted to said second mentioned plate adapted to be connected to a car body, and side brackets connected to the upper extremities of said channel member and adapted for attachment to the car body.

2. In a device of the class described a semi-circular channel member to receive a tire therein, side bracket members connected to the upper extremities thereof and bent downwardly for attachment to the side sills of a motor car, a Z-shaped plate adapted for connection to the central portion of the end sill of a motor car, and means rigidly connecting the downwardly directed portion of said Z-shaped plate with said channel member.

3. In a tire carrier of the class described side and central attaching members for connection to a car body, a channel member rigidly connected to said respective side and central attaching members with the side members bent upwardly for attachment to the upper extremities of said channel member and the central member Z shaped for attachment to the lower central portion thereof, and locking means associated with said channel member to lock a tire therein.

In testimony whereof I have hereunto subscribed my name in the presence of two subscribing witnesses.

WALTER R. GREEN.

Witnesses:
CHARLES W. HILLS, Jr.,
EARL M. HARDINE.